S. G. STEVENS.
DIFFERENTIAL COUPLING.
APPLICATION FILED AUG. 17, 1916.
1,312,709.
Patented Aug. 12, 1919.
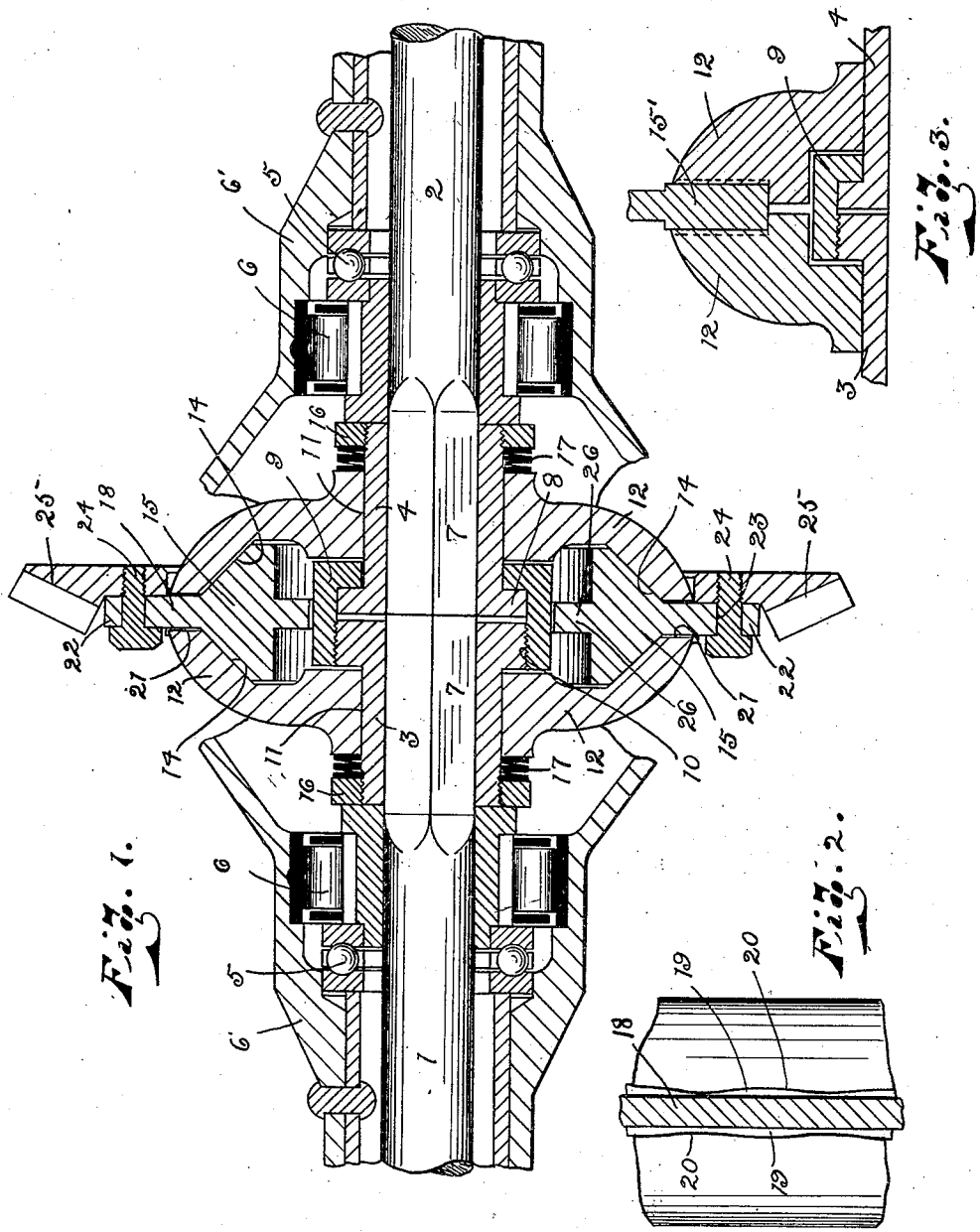
WITNESSES:
INVENTOR.
S. George Stevens

UNITED STATES PATENT OFFICE.

SYLVESTER GEORGE STEVENS, OF DULUTH, MINNESOTA.

DIFFERENTIAL COUPLING.

1,312,709.   Specification of Letters Patent.   Patented Aug. 12, 1919.

Application filed August 17, 1916. Serial No. 115,486.

*To all whom it may concern:*

Be it known that I, SYLVESTER GEORGE STEVENS, a citizen of the United States, residing at Duluth, in the county of St. Louis and State of Minnesota, have invented certain new and useful Improvements in Differential Couplings, of which the following is a specification, reference being had therein to the accompanying drawing.

This invention consists of certain improvements in differential couplings for axles and relates particularly to such a coupling for automobiles, wherein the driving gear forms part thereof.

One object is to produce a differential coupling which will permit of one part of the axle revolving at a different speed to that of the other under abnormal conditions, but at all times under restraint by a normal tendency to travel at the same speed and in the same direction as the other part thereof.

Another object is to produce a differential coupling which will reduce the menace of skidding to a minimum by the predominance of power being automatically applied to the wheel having the greatest traction.

Another object is to produce a differential driver coupling in which a certain predetermined amount of resiliency or freedom of motion is established between the driver and driven parts of the mechanism thus greatly prolonging the life and utility of both.

Another object is to provide a simple differential driving coupling in which the proportion of engine power derived thereby is automatically regulated beyond a certain predetermined extent by the traction of the wheels either jointly or singly.

Still another object is to produce a driving differential shaft coupling in which the minimum of power applied to the shaft is automatically constant irrespective of the wearing of the parts and the maximum of power is governed by the tractability of the wheels.

Other objects and advantages will appear in the further description of the invention.

In the accompanying drawings forming part of this application and in which like reference characters indicate like parts:

Figure 1 is a vertical cross sectional view of my improved differential coupling.

Fig. 2 is a diagrammatic edge view of a portion of the contacting members showing the undulations therein.

Fig. 3 is a fragmental sectional view of a modified form of floating disk or ring.

The invention is illustrated and will be described as applied to the driving axle of an automobile and in the drawings 1 and 2 represent the two halves of such an axle, it being divided for the express purpose of permitting one portion to act independently of the other.

The two abutting ends of the axle are, in common practice, coöperatively limited by means of various forms of differential couplings, well known in the art.

In my improved construction of differential there are sleeves 3 and 4 surrounding the abutting ends of the shaft and extending some distance toward the wheel ends thereof, and upon such extended end of the sleeves are mounted the usual thrust ball bearings 5 and lateral roller bearings 6, both of which bearings engage the shaft housing 6'. These bearings form no part of my present invention, are well known in the art, and may be departed from materially without affecting the invention.

The internal bore of the adjacent ends of the sleeves 3 and 4 is of square form and the abutting ends of the two portions of the shaft, are of the same shape in cross section as illustrated at 7 and are designed to removably fit within the squared portion of the bore of the sleeves whereby each shaft is rotated by its respective sleeve.

The inner end of the sleeve 4 has formed thereon an annular flange or head 8 and which is preferably formed integral therewith. A hollow coupling member 9 surrounds the head 8, it having a hole therein of the same diameter as the sleeve 4 and designed to be slipped thereover when put in place, the opposite end having a screw threaded hole therein slightly larger in diameter that the head 8 and whereby the coupling member may be screw threadedly attached to the adjacent end of the sleeve 3 as at 10, it being properly formed for such reception.

A jam nut or cotter pin as preferred and not shown, may be employed for securely holding the coupling member against accidental dislodgment.

In this manner the two sleeves 3 and 4 are securely united against separation longitudinally, but still are at liberty to rotate independently of each other, and the two portions 1 and 2 of the shaft may be removed or replaced independently of the coupling of the sleeves as is customary in what is known as a floating axle.

At a fixed distance from the coupled ends of the sleeves 3 and 4 to just neatly clear the ends of the coupling 9, each sleeve is square in cross section as at 11—11 and upon such squared portion each sleeve carries a disk 12. Within the inner face of each disk 12 is formed an annular groove or recess having an inclined bearing wall or face 14 therein. These grooves are positioned directly opposite each other and carry in the open space formed thereby the floating master ring 15, it being supported therein by the frictional contact of the inclined walls 14 of the grooves, tightly contacting same.

Each disk 12 is made longitudinally adjustable relative to its respective sleeve, that portion of each sleeve just beyond the squared portion 11 being circular in shape, screw threaded and fitted with a suitable nut 16, whereby the disks may be forced toward each other and made to impinge the master ring with any degree of pressure desired. I have illustrated a spiral spring 17 as interposed between the hub of each disk and its respective adjusting nut 16 to supply resilient contact therebetween, and such resiliency will provide constant pressure of the disks against the master ring irrespective of abnormal conditions arising or natural wear thereof.

The web portion 18 of the master ring 15 is shown as formed with slight undulations 19 upon both side surfaces thereof, and which co-engage with similar undulations 20 in the flat annular surfaces 21 of the disks 12—12 and which frictional engagement upon both sides of the web occurs simultaneously. The axes of the undulations upon the face of the disks and web 18 extend radially thereupon and may or may not be employed as desired.

The object of these undulations is to provide means whereby, in the event of abnormal stress from sudden jerks or strains occurring within the mechanism, the same will be compensated for to some extent by the partial slipping of one or both of the disks upon the master ring and the frictional contact fluctuated in accordance therewith.

It is evident that if either disk should attempt to turn at any speed different from that of the master ring 15, the respective undulations in passing each other would thrust the contacting members apart and materially increase their frictional engagement which would tend to retard such slipping, the increased frictional contact being caused by the compression of the springs 17—17 intermediate the nuts 16—16 and disk hubs.

If one disk only tends to slip, the undulations in the contacting surfaces of such members will tend to pass each other with less resistance than if both disks attempted to slip simultaneously.

Undoubtedly, under ordinary abnormal circumstances both disks would slip equally, but many conditions would arise, for instance wherein one wheel of the vehicle would tend to freely spin, in which case the engaging undulations upon that side of the master ring would remain in their normal positions and the resultant increase of frictional contact upon the opposite side of the ring, caused by the passing of the undulations thereupon be equal to one half that caused by equal slipping of both disks.

Equal slipping of both disks would occur in heavy hill climbing and the application of efficiency of the motive power proportionately increased or brought to maximum in accordance with the fixed adjustment of the nuts 16—16.

The extreme outer rim 22 of the ring 15 has formed therein suitable holes 23 for bolts 24 whereby the master gear 25 is secured thereto, for driving the mechanism. Such arrangement of master gear being in the form of a ring gear applied by bolts is well known and old in the art.

I have illustrated an inwardly extending web 26 of the master ring 15 having a hole therethrough just equal to the outside diameter of the coupling member 9 and designed to fit thereover and be borne by same when the disks 12 and 13 are relieved from pressure against the inclined surfaces 14, by abnormal conditions, or the full width of the ring 15 may extend to and rest upon the member 9, if preferred.

It is evident that the inclined surfaces 14 may be made much flatter, that is nearer horizontal, and require but a fraction of the power on the part of the compression nuts 16 to hold them sufficiently tight to the ring 15, and also that the undulations on the web 18 may be wholly dispensed with, if desired. However, I have shown the combination appearing most practicable for the purpose, and the depth of bearing surface of the web 18 is such as to equally wear with the inclined faces 14 and when frictional contact of such latter surfaces is broken, the undulations are of sufficient depth to carry the load properly.

In Fig. 3 of the drawings is illustrated a modified form of disks 12 and master ring 15 and in which the frictional engaging surfaces therebetween are vertical and may or may not be provided with undulations as indicated by dotted lines thereupon. It is evident that in this construction the disks 12—12 would have to impinge the ring 15, with considerably greater force than where the engaging surfaces are inclined as in Fig. 1

1, but the former may prove the more desirable as it is simpler and in the event of being formed without the undulations in the contacting surfaces, the disks may be set up to a certain degree of tightness without any spring or resiliency whatever, and depend entirely upon their ability to slip for providing the desired differentiating properties.

Having thus described my invention what I claim as new and desire to secure by Letters Patent, is:

1. In combination, a two part shaft having the ends thereof abutting each other, coöperating means carried by the abutting ends of the shaft, holding same together and permitting of independent rotative action of each part, two spaced driven members one upon each part of the shaft for rotating same and a driving member intermediate of the driven members and in frictional engagement therewith.

2. In combination, a two part shaft coöperative means carried by the adjacent ends of the shaft for holding the same together and permitting of independent rotative action of each part, two spaced driven members one upon each part of the shaft for rotating same and a driving member intermediate of the driven members and in constant frictional engagement therewith.

3. In combination, a two part shaft, coöperative means carried by the adjacent ends of the parts for holding same together and permitting of independent rotative action of each part, spaced driven members carried upon the parts of the shaft for rotating same, a driving member intermediate of the driven members and in frictional engagement therewith and means carried by the shaft for holding the driven members in yieldable engagement with the driving member.

4. The combination with a differential driving coupling for a two part shaft comprising a central driving member and spaced driven members one upon each part of the shaft and in constant active frictional engagement with the driving member, of means for automatically varying in either direction the frictional engagement of the parts under abnormal conditions.

5. The combination with a differential driving coupling for a two part shaft comprising a central driving member and spaced driven members one upon each part of the shaft and in active frictional engagement with the driving member, of means for automatically varying in either direction the frictional engagement of the parts as occasion may require.

6. The combination with a differential driving coupling for a two part shaft having spaced driven members one fixed to each abutting end of the shaft parts, of a driving member having a gear rigid therewith interposed between the driven members and in permanent frictional engagement therewith and means for automatically varying in either direction the frictional engagement of the driving parts as occasion may require.

7. In combination, a two part shaft, coöperating means carried by the adjacent ends of the parts for holding same together and permitting of independent rotative action of each part, two spaced driven members one upon each part of the shaft for rotating same and a driving member surrounding the holding means said driving member being intermediate of the driven members and in frictional engagement therewith.

8. In combination, a two part shaft, coöperative means carried by the adjacent ends of the shaft parts for holding same together and permitting of independent rotative action thereof, two spaced driven members one upon each part of the shaft for rotating same, a driving member intermediate of the driven members and frictionally engaging same and means intermediate of the driving and driven members for automatically varying the frictional engagement thereof for the purpose described.

9. In a two part shaft differential coupling of the character described the combination with an open centered frictional driving member, a coöperative driven member carried by each part of the shaft and in frictional engagement with the driving member and coöperative interlocking means carried by the abutting ends of the shaft for holding them together and the frictional means in operative engagement.

In testimony whereof I hereunto affix my signature in the presence of two witnesses.

SYLVESTER GEORGE STEVENS.

Witnesses:
W. H. DENHAM,
G. B. WATTS.

Copies of this patent may be obtained for five cents each, by addressing the "Commissioner of Patents, Washington, D. C."